(12) United States Patent
Gertner

(10) Patent No.: US 8,225,002 B2
(45) Date of Patent: *Jul. 17, 2012

(54) DATA STORAGE AND DATA SHARING IN A NETWORK OF HETEROGENEOUS COMPUTERS

(75) Inventor: Ilya Gertner, Long Beach, CA (US)

(73) Assignee: Network Disk, Inc., Long Beach, CA (US)

( * ) Notice: Subject to any disclaimer, the term of this patent is extended or adjusted under 35 U.S.C. 154(b) by 669 days.

This patent is subject to a terminal disclaimer.

(21) Appl. No.: 10/382,016

(22) Filed: Mar. 5, 2003

(65) Prior Publication Data

US 2003/0145114 A1    Jul. 31, 2003

Related U.S. Application Data

(62) Division of application No. 09/236,409, filed on Jan. 22, 1999, now Pat. No. 6,549,988.

(51) Int. Cl.
*G06F 15/16* (2006.01)

(52) U.S. Cl. ............... 709/249; 709/226; 709/217

(58) Field of Classification Search ............ 709/226, 709/249, 201, 212, 213–216
See application file for complete search history.

(56) References Cited

U.S. PATENT DOCUMENTS

| | | | |
|---|---|---|---|
| 5,611,049 A * | 3/1997 | Pitts | 707/8 |
| 5,896,506 A * | 4/1999 | Ali et al. | 709/213 |
| 5,898,828 A * | 4/1999 | Pignolet et al. | 714/6 |
| 5,901,327 A * | 5/1999 | Ofek | 710/5 |
| 5,974,503 A * | 10/1999 | Venkatesh et al. | 711/114 |
| 6,016,500 A * | 1/2000 | Waldo et al. | 1/1 |
| 6,101,508 A * | 8/2000 | Wolff | 709/223 |
| 6,119,151 A * | 9/2000 | Cantrell et al. | 709/216 |
| 6,182,111 B1 * | 1/2001 | Inohara et al. | 709/201 |
| 6,341,311 B1 * | 1/2002 | Smith et al. | 709/226 |
| 6,438,652 B1 * | 8/2002 | Jordan et al. | 711/120 |
| 6,457,047 B1 * | 9/2002 | Chandra et al. | 709/217 |
| 6,711,632 B1 * | 3/2004 | Chow et al. | 710/29 |
| 6,785,714 B1 * | 8/2004 | Thompson et al. | 709/213 |
| 6,829,637 B2 * | 12/2004 | Kokku et al. | 709/216 |
| 6,850,980 B1 * | 2/2005 | Gourlay | 709/226 |
| 7,133,905 B2 * | 11/2006 | Dilley et al. | 709/219 |
| 7,188,251 B1 * | 3/2007 | Slaughter et al. | 713/182 |
| 7,254,617 B2 * | 8/2007 | Schuh et al. | 709/214 |
| 7,287,065 B2 * | 10/2007 | Nishi et al. | 709/219 |

OTHER PUBLICATIONS

Dahlin, Wang, Anderson, and Patterson. Cooperative Caching: Using Remote Client Memory to Improve File System Performance. Operating Systems Design and Implementation (OSDI). 1994.*
U.S. Appl. No. 09/236,409, filed Apr. 15, 2003, Gertner, Ilya.
http://www.harwood-intl.com/ncrproducts/5100M_NCR.asp.
Internet Archive Waybackmachine http://www.archive.org/web/web.php.

* cited by examiner

Primary Examiner — Kamal Divecha
(74) Attorney, Agent, or Firm — Fish & Richardson P.C.

(57) ABSTRACT

A network of PCs includes an I/O channel adapter and network adapter, and is configured for management of a distributed cache memory stored in the plurality of PCs interconnected by the network. The use of standard PCs reduces the cost of the data storage system. The use of the network of PCs permits building large, high-performance, data storage systems.

14 Claims, 13 Drawing Sheets

VOLUME ACCESS TABLE

DATA STORAGE AND DATA SHARING IN A NETWORK OF HETEROGENEOUS COMPUTERS

RELATED APPLICATIONS

The present application claims the benefit of priority as a divisional application under 35 U.S.C. §121 of U.S. Ser. No. 09/236,409, filed Jan. 22, 1999, now U.S. Pat. No. 6,549,988, "DATA STORAGE SYSTEM COMPRISING A NETWORK OF PCs AND METHOD USING SAME," issued: Apr. 15, 2003, the entire disclosure of which is incorporated by reference in its entirety.

FIELD OF THE INVENTION

This invention relates generally to the field of cached data storage systems and more particularly to a data storage system that permits independent access from local hosts connected via I/O channels and independent access from remote hosts and remote storage systems connected via network links. A network of PCs permits building a high-performance, scalable, data storage system using off-the-shelf components at reduced cost. A configuration manager ensures consistency of data stored in the distributed cache.

BACKGROUND OF THE INVENTION

A typical data processing system generally involves a cached data storage system that connects to local host computers via I/O channels or remote host computers via network links. The purpose of the data storage system is to improve the performance of applications running on the host computer by offloading I/O processing from the host to the data storage system. The purpose of the cache memory in a data storage system is to further improve the performance of the applications by temporarily storing data buffers in the cache so that the references to those buffers can be resolved efficiently as "cache hits". Reading data from a cache is an order of magnitude faster than reading data from a back end storage device such as a disk. Writing data to a cache is also an order of magnitude faster than writing to a disk. All writes are cache hits because data is simply copied into cache buffers that are later flushed to disks.

Prior art data storage systems are implemented using proprietary hardware and very low-level software, frequently referred to as microcode, resulting in expensive and not portable systems. In contrast to the prior art systems, the preferred embodiment of the present invention uses standard hardware and software components. A network of commercial PCs is used to implement a high-performance data storage system. A method using the network of PCs includes an algorithm for a configuration manager that manages access to the distributed cache memory stored in PCs interconnected by the network.

Numerous prior art systems and methods exist for managing cache memory in a data storage system. The prior art has suggested several methods for managing cache for channel attached hosts. U.S. Pat. No. 5,717,884, Gzym, et. al., Feb. 2, 1996, Method and Apparatus for Cache Management, discloses data structures and algorithms that use a plurality of slots, each of which is used to store data files. U.S. Pat. No. 5,757,473, Vishlitzky, et. al., Cache Management system using time stamping for replacement queue, Jul. 28, 1998, discloses a method that uses time stamps to manage queues in a cached data storage system. U.S. Pat. No. 5,751,993, Ofek, et. al., May 12, 1998, Cache Management Systems, discloses yet another aspect in queue management algorithms. U.S. Pat. No. 5,600,817, Macon Jr., et. al., Feb. 4, 1997, Asynchronous read-ahead disk caching using multiple disk I/O processes and dynamically variable prefetch length, discloses read-ahead methods in cached storage systems. U.S. Pat. No. 5,758,050, Brady, et. al., May 26, 1998, Reconfigurable data storage system, discloses a method for reconfiguring a data storage system.

However, the above systems use very specialized embedded operating systems and custom programming in a very low-level programming language such as assembler. The obvious drawback of the above systems is high cost because assembler-level programming is very time consuming. Another drawback is inflexibility and lack of functionality. For example, some features such as reconfigurability in data storage are very limited in proprietary embedded systems when compared to general purpose operating systems. Finally, networking support is very expensive and limited because it relies on dedicated communication links such as T1, T3 and ESCON.

One prior art system using networking of data storage systems is disclosed in U.S. Pat. No. 5,742,792, Yanai, et. al., Apr. 21, 1998, Remote Data Mirroring. This patent discloses a primary data storage system providing storage services to a primary host and a secondary data storage system providing services to a secondary host. The primary storage system sends all writes to the secondary storage system via IBM ESCON, or optionally via T1 or T3 communications link. The secondary data storage system provides a backup copy of the primary storage system. Another prior art system is disclosed in U.S. Pat. No. 5,852,715, Raz, et al., Dec. 22, 1998, System for currently updating database by one host and reading the database by different host for the purpose of implementing decision support functions.

However, the above systems use dedicated communication links that are very expensive when compared to modern networking technology. Furthermore, the data management model is limited to the primary-node sending messages to the secondary node scenario. This model does not support arbitrary read and write requests in a distributed data storage system.

There is a growing demand for distributed data storage systems. In response to this demand some prior art systems have evolved into complex assemblies of two systems, one proprietary a data storage system and the other an open networking server. One such system is described in a white paper on a company web site on Internet. The industry white paper, EMC Data Manager: A high-performance, centralized open system backup/restore solution for LAN-based and Symmetrix resident data, describes two different systems, one for network attached hosts and second for channel attached hosts. The two systems are needed because of the lack of generic networking support. In related products such as Celerra File Server, product data sheets suggest using data movers for copying data between LAN-based open system storage and channel attached storage system.

However, the above systems are built from two systems, one for handling I/O channels, and another for handling open networks. Two systems are very expensive even in minimal configuration that must include two systems.

In another branch of storage industry, network attached storage systems use network links to attach to host computers. Various methods for managing cache memory and distributed applications for network attached hosts have been described in prior art. U.S. Pat. No. 5,819,292, Hitz, et. al., Method for maintaining consistent states of a file system and for creating user-accessible read-only copies of a file system, Oct. 6, 1998, U.S. Pat. No. 5,644,751, and Burnett, et. al., Jul. 1, 1997, Distributed file system (DFS) cache management system based on file access characteristics, discloses methods for implementing distributed file systems. U.S. Pat. No. 5,649,105, Aldred, et. al., Jul. 15, 1997, Collaborative working in a network, discloses programming methods for distributed applications using file sharing. U.S. Pat. No. 5,701,516, Chen, et. al., Dec. 23. 1997, High-performance non-volatile RAM protected write cache accelerator system employing DMA and data transferring scheme, discloses optimization methods for network attached hosts. However, those systems support only network file systems. Those systems do not support I/O channels.

In another application of storage systems, U.S. Pat. No. 5,790,795, Hough, Aug. 4, 1998, Media server system which employs a SCSI bus and which utilizes SCSI logical units to differentiate between transfer modes, discloses a media server that supports different file systems on different SCSI channels. However the system above is limited to a video data and does not support network attached hosts. Furthermore, in storage industry papers, Data Sharing, by Neema, Storage Management Solutions, Vol. 3, No. 3, May 1998, and another industry paper, Storage management in UNIX environments: challenges and solutions, by Jerry Hoetger, Storage Management Solutions, Vol. 3, No. 4, survey a number of approaches in commercial storage systems and data sharing. However, existing storage systems are limited when applied to support multiple platform systems.

Therefore, a need exists to provide a high-performance data storage system that is assembled out of standard modules, using off-the-shelf hardware components and a standard general-purpose operating system that supports standard network software and protocols. In addition, the needs exists to provide a cached data storage system that permits independent data accesses from I/O channel attached local hosts, network attached remote hosts, and network-attached remote data storage systems.

SUMMARY OF THE INVENTION

The primary object of the invention is to provide a high performance, scalable, data storage system using off-the-shelf standard components. The preferred embodiment of the present invention comprises a network of PCs including an I/O channel adapter and network adapter and method for managing distributed cache memory stored in the plurality of PCs interconnected by the network. The use of standard PCs reduces the cost of the data storage system. The use of the network of PCs permits building large, high-performance, data storage systems.

Another object of the invention is to provide a distributed cache that supports arbitrary reads and writes arriving via I/O channels or network links, as well as a method for sharing data between two or more heterogeneous host computers using different data formats and connected to a data storage system. The method includes a translation module that inputs a record in a format compatible with the first host and stores the translated record in a data format compatible with the second host. Sharing of data in one format and having a translation module permitting representations in different formats in cache memory provides a means for improving performance of I/O requests and saving disk storage space.

In accordance with a preferred embodiment of the invention, a data storage system comprises a network of PCs each of which includes a cache memory, an I/O channel adapter for transmitting data over the channel and a network adapter for transmitting data and control signals over the network. In one embodiment, a method for managing resources in a cache memory ensures consistency of data stored in the distributed cache. In another embodiment, a method for sharing data between two or more heterogeneous hosts includes the steps of: reading a record in a format compatible with one computer; identifying a translation module associated with the second computer; translating the record into the format compatible with the second computer and writing said translated record into a cache memory.

The preferred embodiment of the present invention involves a method for building a data storage system that provides superior functionality at lower cost when compared to prior art systems. The superior functionality is achieved by using an underlying general purpose operating system to provide utilities for managing storage devices, backing data, troubleshooting storage devices and performance monitoring. The lower cost is achieved by relying on standard components. Furthermore, the preferred embodiment of the present invention overcomes the limitations of prior art systems by providing concurrent access for both I/O channel attached hosts and network link attached hosts.

The preferred embodiment of this invention uses SCSI channels to connect to local hosts and uses standard network links card such as Ethernet, or ATM to connect to remote hosts. The alternate embodiment of the present invention uses fiber channel link such as Fibre Channel as defined by the Fibre Channel Association, FCA, 2570 West El Camino Real, Ste. 304, Mountain View, Calif. 94040-1313 or SSA as defined SSA Industry Association, DEPT H65/B-013 5600 Cottle Road, San Jose, Calif. 95193. Prior art systems such as U.S. Pat. No. 5,841,997, Bleiwess, et. al., Nov. 24, 1998, Apparatus for effecting port switching of fibre channel loops, and U.S. Pat. No. 5,828,475, Bennett, et. al., Oct. 27, 1998, Bypass switching and messaging mechanism for providing intermix fiber optic switch using a bypass bus and buffer, disclosure methods that connects disks and controllers. However, the problems remain in software, solution of which require methods described in the preferred embodiment of the present invention.

The drawings constitute a part of this specification and include exemplary embodiments to the invention, which may be embodied in various forms.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting.

Figure 1:
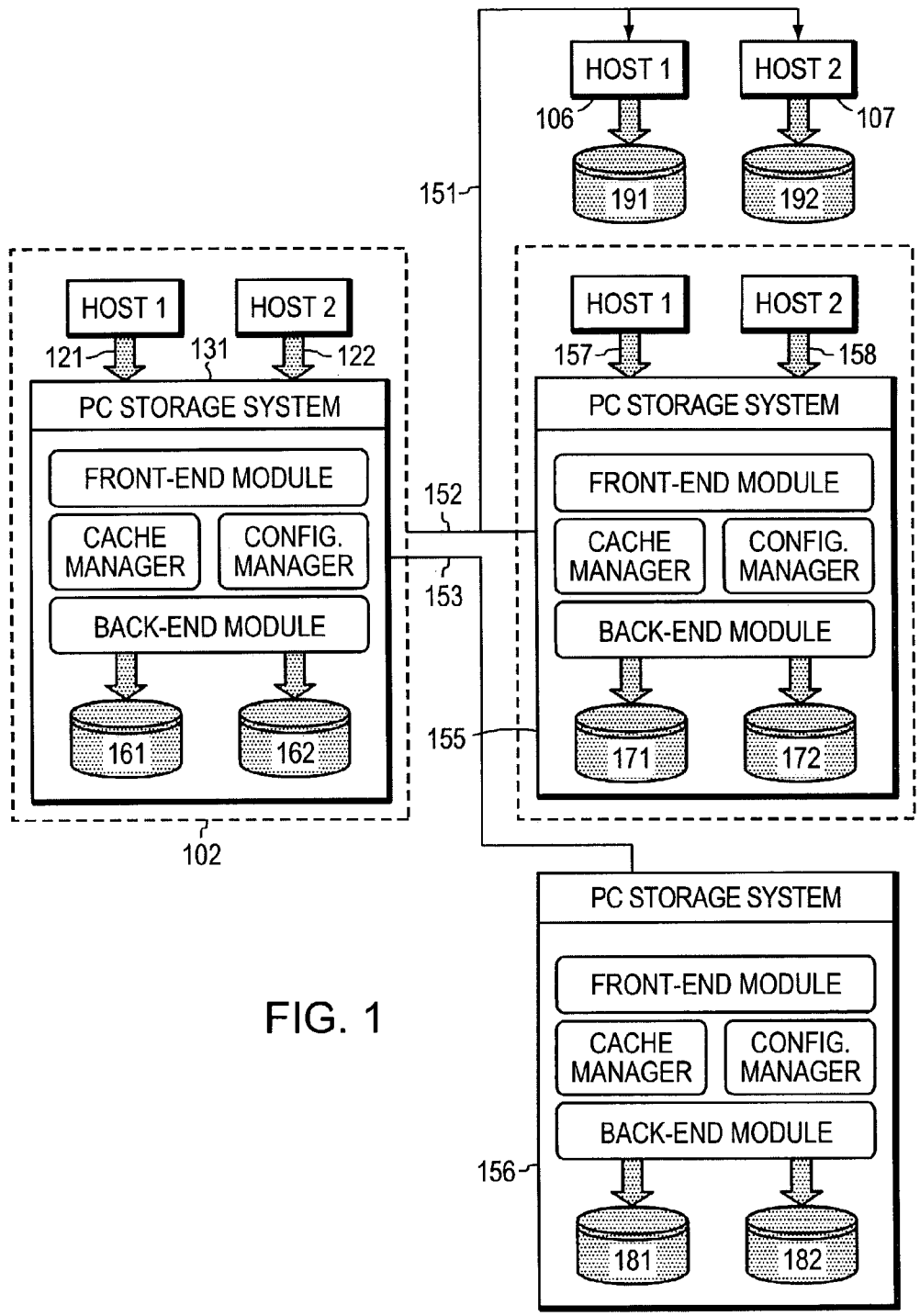
FIG. 1 shows data storage systems configurations.

FIG. 1 illustrates data storage system configurations of the preferred embodiment. The PC data storage system 131 services a plurality of channel attached host processors 111, 112 using channels 121, 122, and a plurality of network attached host processors 106, 107 using network link 151, and a plurality of network attached data storage systems 132, 133 using network links 152, 153. PC storage system 132 services channel attached hosts 157, 158.

Hosts 157 and 158 access a data storage system 131 indirectly via network attached data storage system 132, thereby offloading communications protocol overhead from remote hosts 157, 158. Hosts 106 and 107 directly access storage system 131 via network link 151 thereby incurring communications protocol overhead on hosts 106, 107 and therefore decreasing performance of applications running on said hosts.

Host 111 accesses remote disk 181 via local data storage system 131, network link 153, and remote data storage system 133 without incurring protocol overhead on host 111. Host 157 accesses disk 161 via data storage system 133, network link 152, and data storage system 131 without incurring protocol overhead on host 157. Host 106 directly accesses local disk 161 via network link 151 thereby incurring protocol overhead. The disks 191, 192 that are attached to hosts 106, 107 without a data storage system, cannot be accessed by outside hosts.

Figure 2:
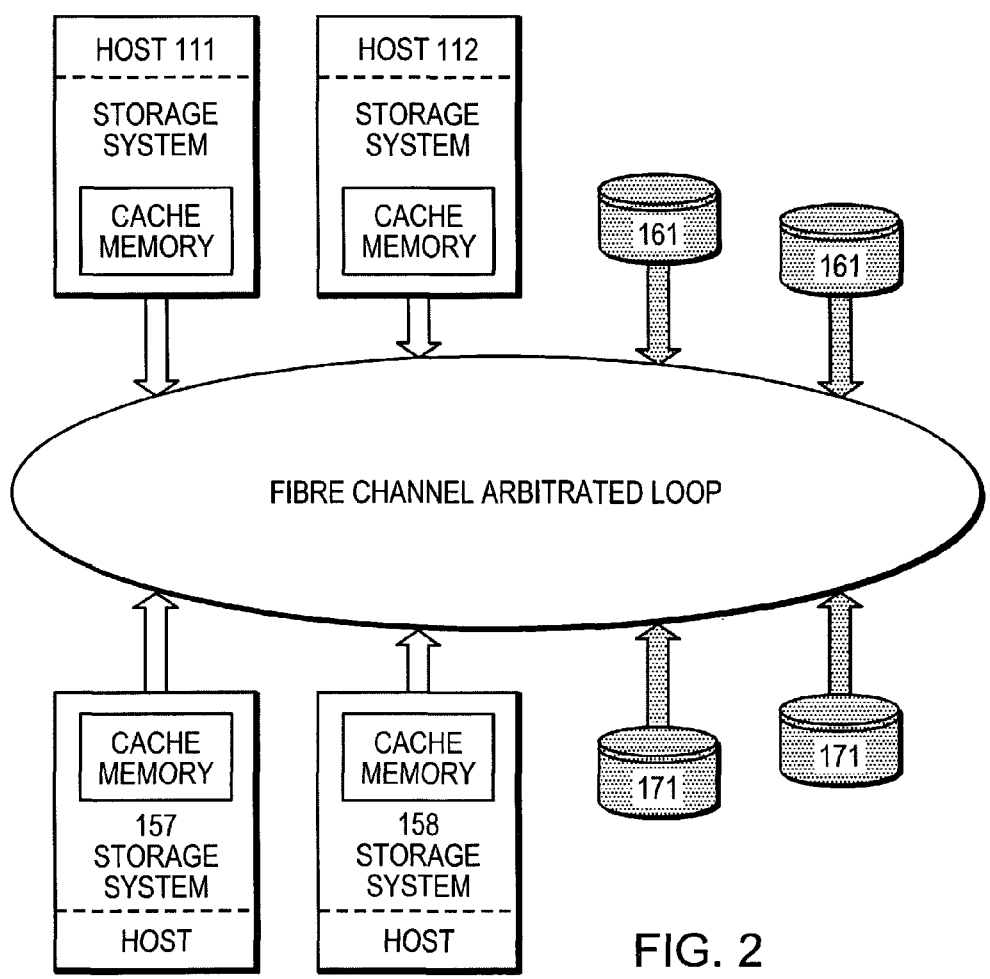
FIG. 2 illustrates in block diagram form the alternate embodiment of the data storage system of the present invention.
Figure 2A:
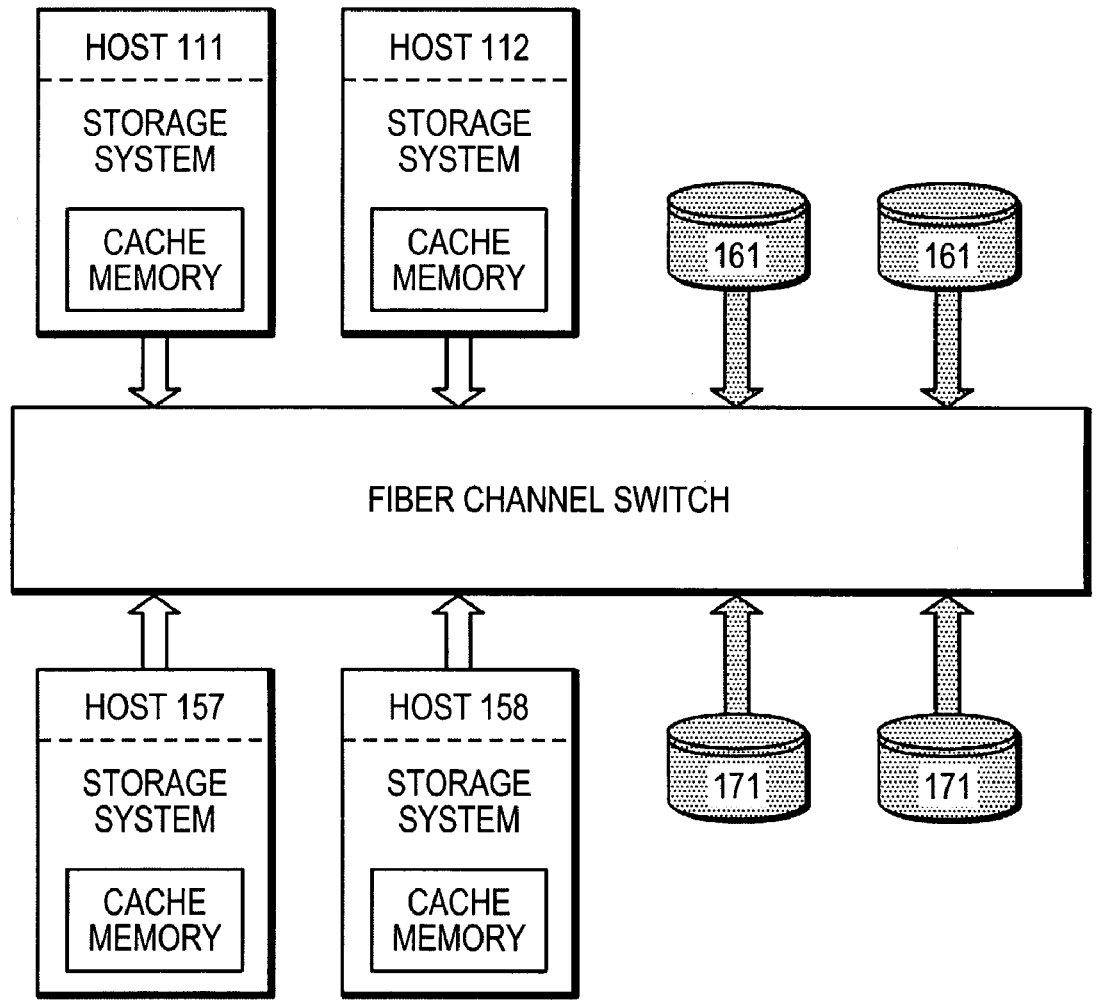
FIG. 2A illustrates in block diagram form the alternate embodiment of the data storage system of the present invention.
Figure 2B:
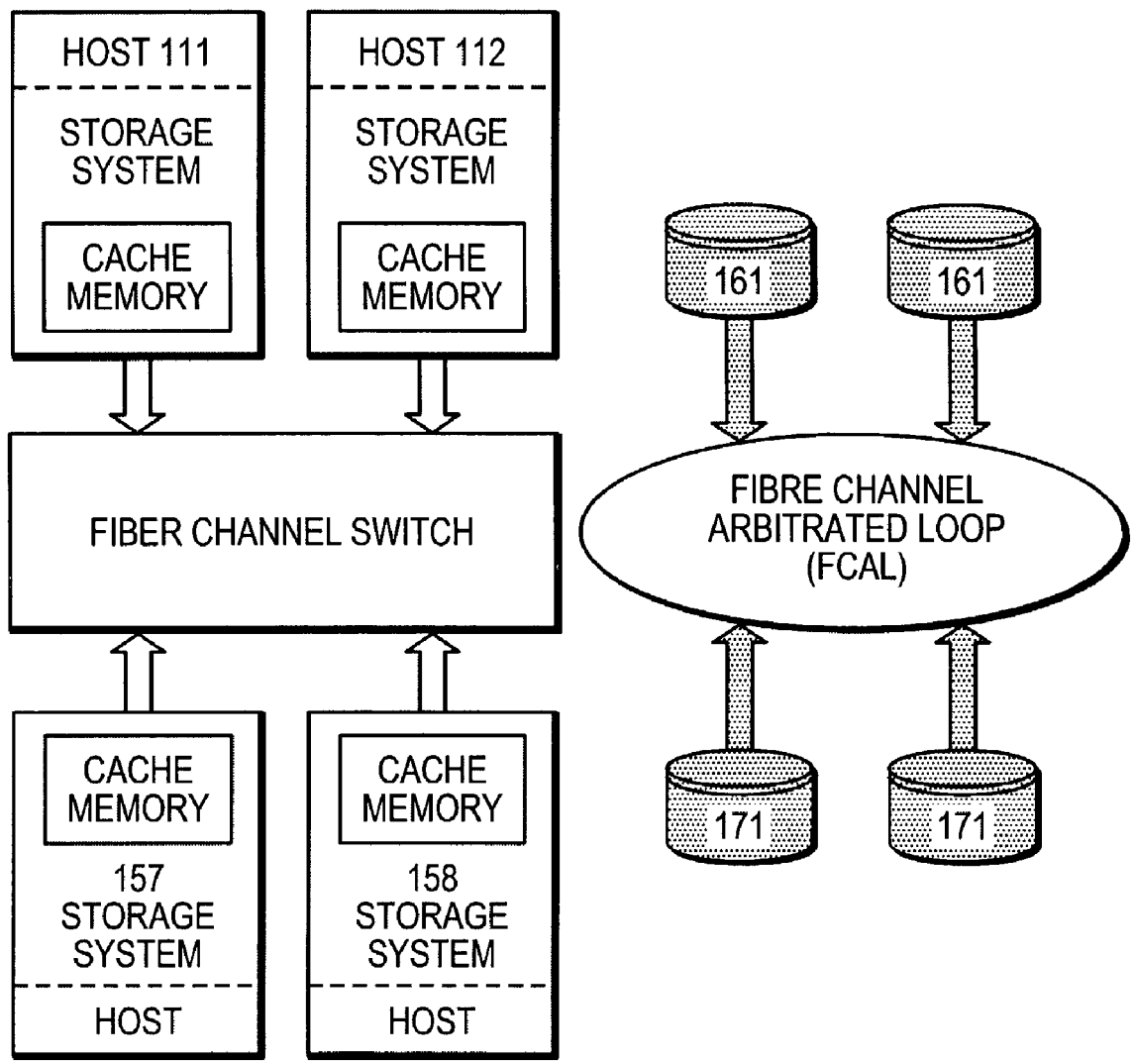
FIG. 2B illustrates in block diagram form another variation of the alternate embodiment of the present invention.

The preferred embodiment of the present inventions uses well-established technologies such as SCSI channels for I/O traffic and Ethernet link for network traffic. In FIG. 2, the alternate embodiment of the present invention uses fiber channel technology for both I/O traffic and network traffic. The fiber channel connects computers and hard disks into one logical network. In one variation of the alternate embodiment in FIG. 2, the fiber optics link is organized as a Fiber Channel Arbitrated Loop (FCAL). In another variation shown in FIG. 2A, the fiber optics link is organized as a switching network. In yet another variation in FIG. 2B, the fiber channel is organized in two FCAL loops connected via switch.

Figure 3:
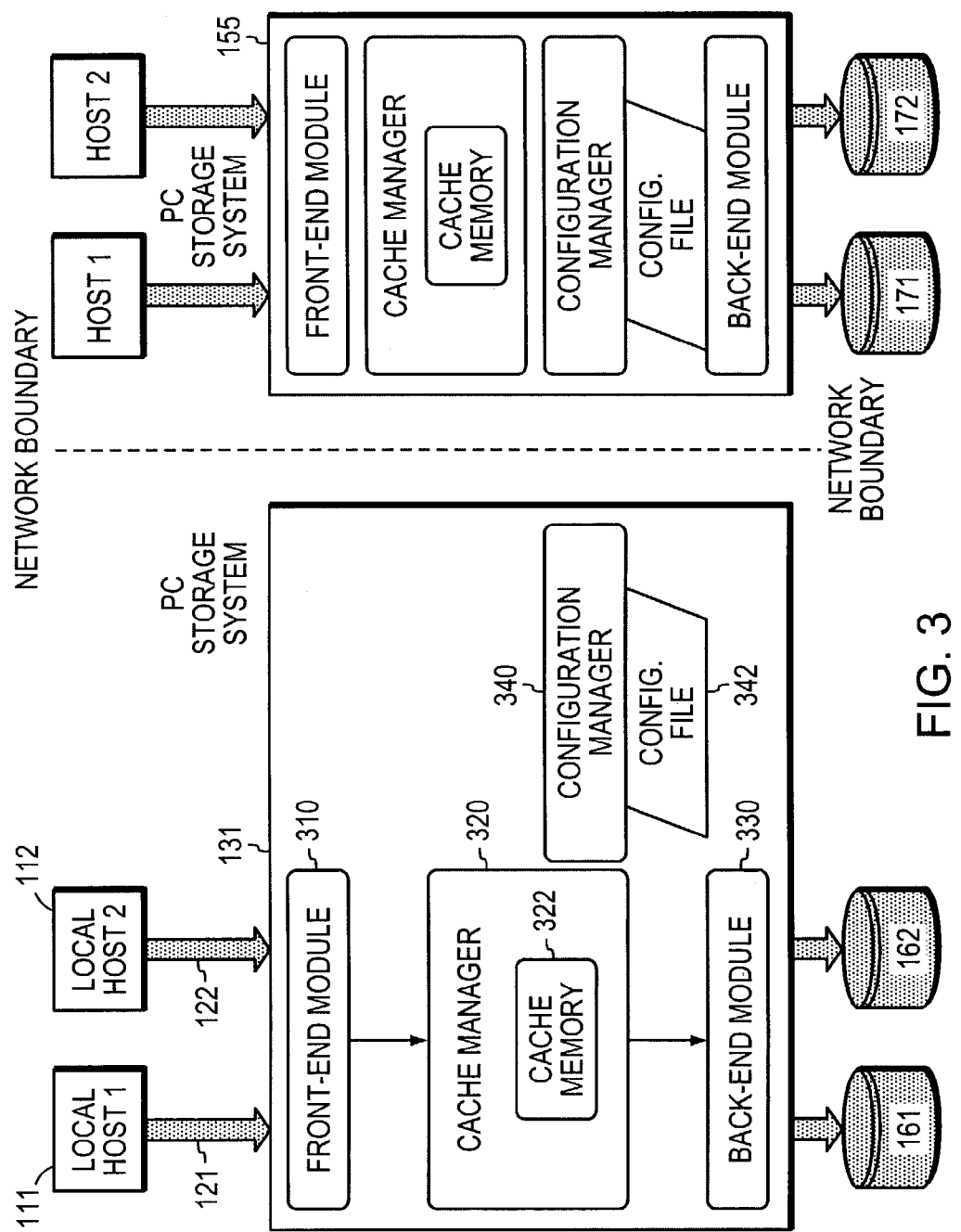
FIG. 3 shows a PC data storage system.

FIG. 3 shows a software architecture and modules of a PC data storage system corresponding to the data storage system 131 in FIG. 1. Data is received from the hosts 111, 112 via I/O channels 121, 122 in front-end software module 310 in FIG. 3. The front-end module 310 handles channel commands and places the results in cache memory 322 in the form of new data or modification to data already stored on the disk 161. The cache manager software module 320 calls routines in the configuration manager 340 to ensure consistency of the cache memory in other network attached data storage systems. At some later point in time, the back-end software module 342 invokes a page flusher module to write modified data to disks 161 and 162 and free up cache memory.

In FIG. 3, front-end module 310 including I/O adapter driver has been modified to accept target SCSI I/O requests from hosts 111 and 112. Said front-end module handles I/O requests in such a manner that hosts 111 and 112 are not aware of a data storage system. Hosts 111 and 112 issue I/O requests as if the request is going to a standard disk.

The presence of fast access cache memory permits front end channels and network links to operate completely independent of the back-end physical disk devices. Because of this front-end/back-end separation, the data storage system 131 is liberated from the I/O channel and network timing dependencies. The data storage system is free to dedicate its processing resources to increase performance through more intelligent scheduling and data transfer network protocol.

Figure 4:
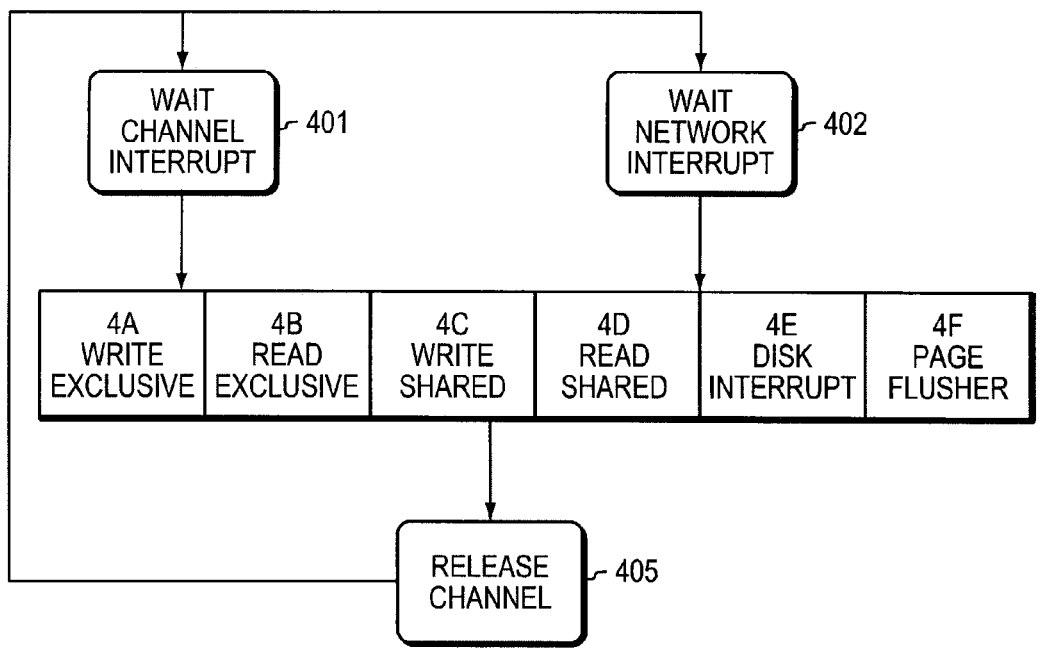
FIG. 4 illustrates in data flow diagram form the operations of a data storage system including.
Figure 4:
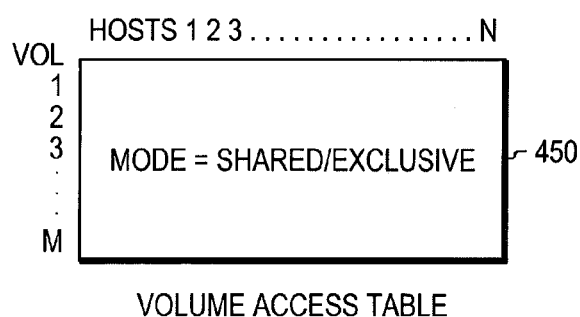
Figure 4A:
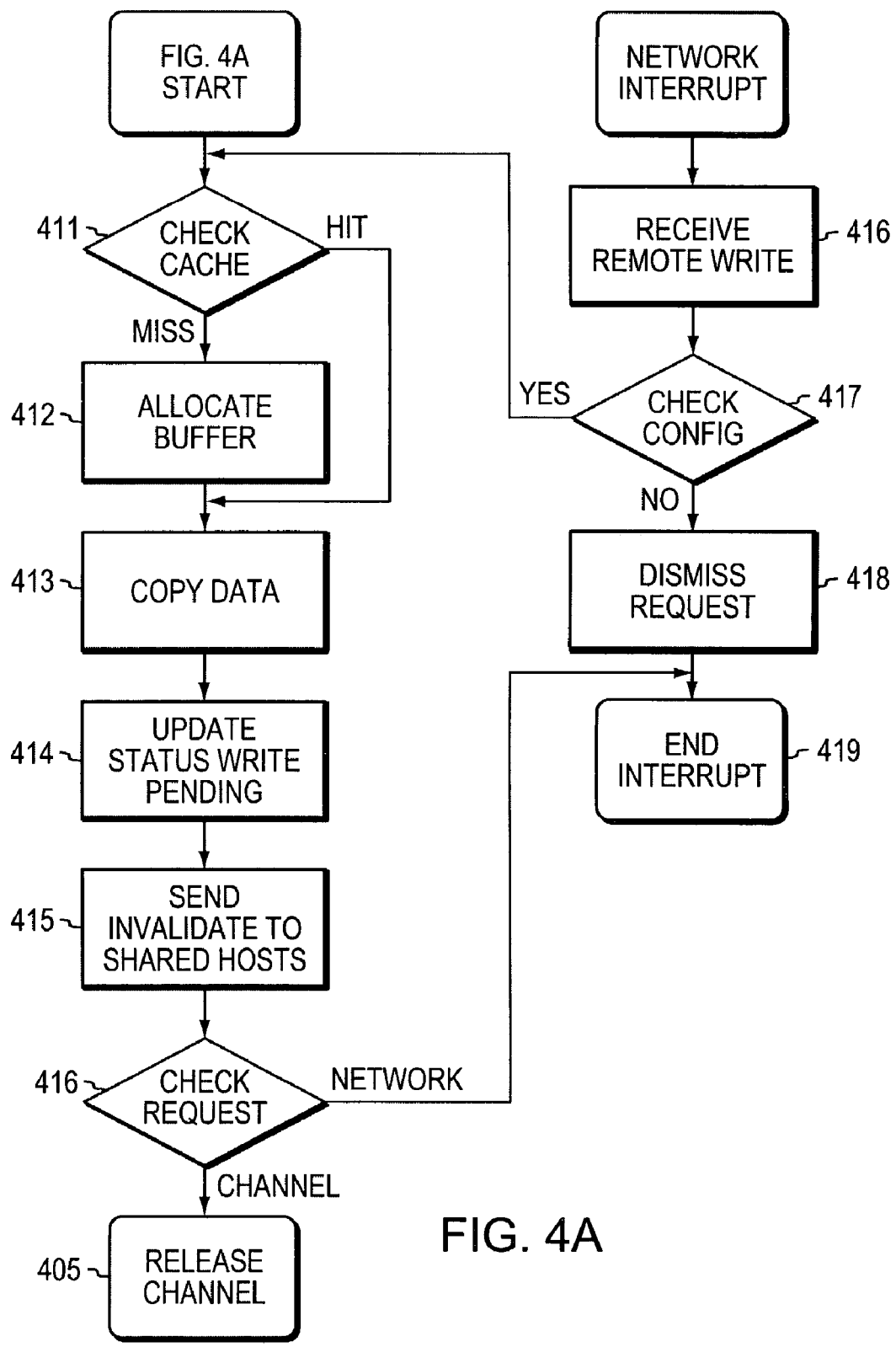
FIG. 4A illustrating operations in write exclusive mode, FIG. 4B in read exclusive mode, FIG. 4C in write shared mode, FIG. 4D in read shared mode, FIG. 4E in disk interrupt, FIG. 4F in page flusher.

FIG. 4 shows a flowchart of a data storage system in the process of reading or writing to data volumes stored on disk drives shown in FIG. 3. The flowchart uses a volume access table 450 (see also FIG. 5) and controlled by the configuration manager. Local operations begin in step 401 where the corresponding front-end module 310 of FIG. 3 allocates a channel and waits for I/O requests from the initiating hosts 111 or 112. Remote operations begin in step 402. Depending upon the status of the value in a volume access table 450 the requests are routed either as shown in FIG. 4A for write exclusive mode, FIG. 4B for read exclusive, FIG. 4C for write shared or FIG. 4D for read shared. Concurrently with the processing of I/O operations, the independent page flusher daemon shown in FIG. 4F scans cache memory and writes buffers to disks. Disk interrupt processing is shown in FIG. 4E.

Volume access table 450 (see FIG. 4) contains a mapping between hosts and volumes specifying an access mode value. If the access mode is set neither to shared nor exclusive, the configuration manager forwards I/O requests directly to disk. In addition to the access mode, the volume access table may contain other values that help the configuration manager and improve performance of the data storage system.

Figure 5:
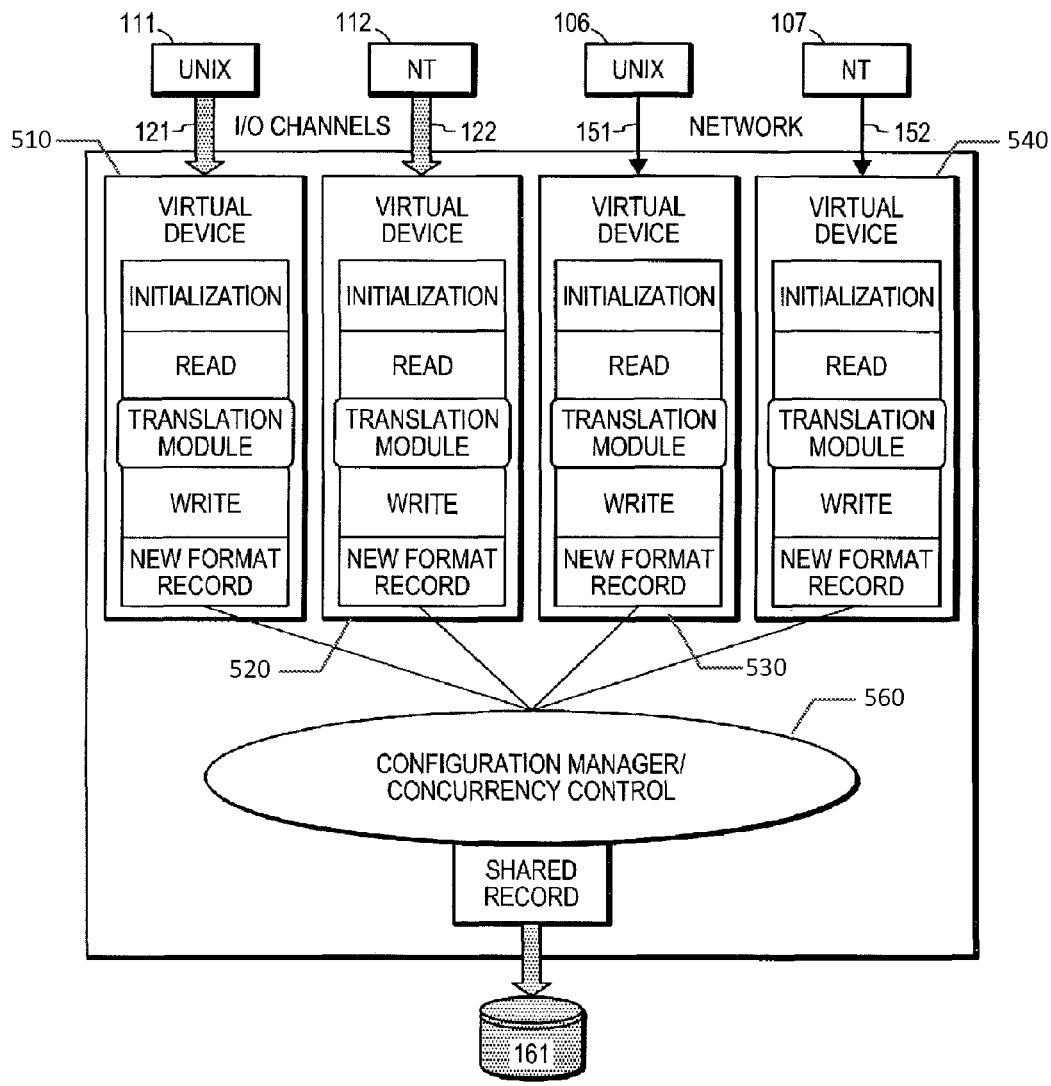
FIG. 5 illustrates in block diagram form data sharing operations.

In another embodiment of this application, shown in FIG. 5, the volume access table includes a translation module for a given host to facilitate volume mapping. The translation module is a dynamically loadable library that can be changed, compiled and linked at run-time.

A user of a data storage system can externally set the values and parameters in a volume access table. For each host and volume pair, a user can explicitly specify the access mode value. For some applications, where data on a remote volume is accessed infrequently, the user may want to specify other than shared or exclusive in order to disable cache for the remote volume. By disabling caching, the user eliminates cache coherency traffic entirely for the volume. In a data storage system, a user or a system administrator actively monitors and changes the behavior of a cache manager by changing values in a volume access table in order to improve performance of the data storage system.

FIG. 4A shows a flowchart of the cache manager 320 (see FIG. 3) as it processes a write request in an exclusive mode. In step 411 of FIG. 4A, the cache manager checks whether the requested buffer is in cache or not. For a cache miss, in step 412, the cache manager allocates a new buffer for storing data that will be written. For a cache hit, the cache manager branches directly to step 413 where data is copied into the newly allocated buffer. In step 414, the cache manager calls a configuration manager routine that sends an invalidate request to the list of shared hosts for this particular volume. In step 415, the cache manager checks the type of a request. For a channel type of a request, the cache manager returns to step 405 to release the channel. For a network type of a request, the cache manager proceeds to release network request in step 419 on the right side of FIG. 4A.

On the right side of FIG. 4A, in step 416, network interrupt identifies and receives a remote write request. In step 417, the cache manager calls configuration manager routine to determine the validity of the request. Bad requests are ignored in step 418. Correct requests proceed to step for 410 for write exclusive processing. Step 415 returns the flow to step 419, which releases network resources.

Figure 4B:
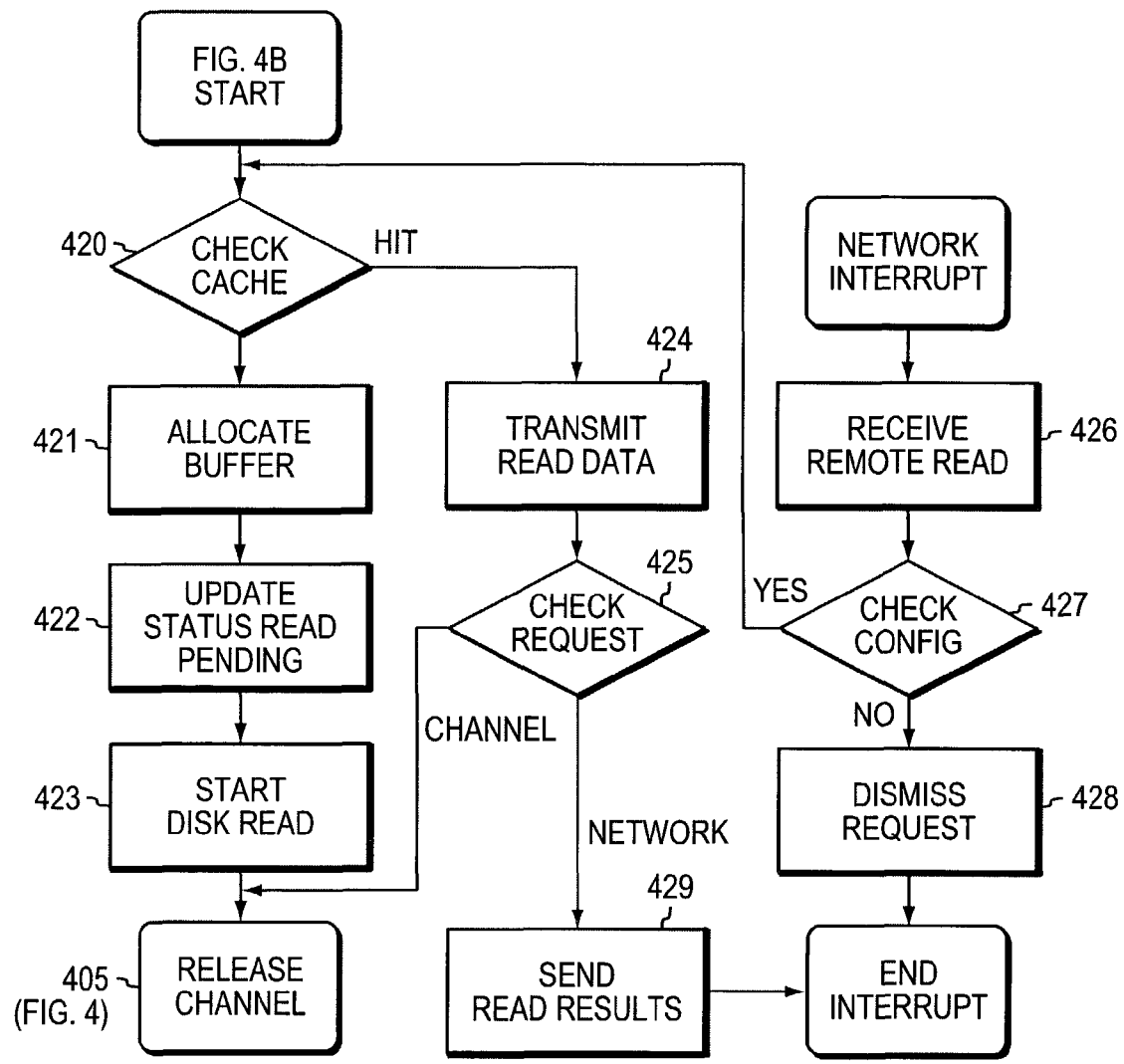

FIG. 4B shows a flowchart of the cache manager as it processes a read request in an exclusive mode. In step 420, the cache manager checks whether the requested buffer is in cache or not. For a cache miss, in step 421, the cache manager allocates a buffer for storing data that will be read in. In step 422, the cache manager updates the buffer status with read pending. In step 423, the cache manager starts an operation to read from a hard disk driver and proceeds to release the channel in step 405. For a cache hit, in step 424, the cache manager transmits read data and proceeds to release the channel in step 405. For an identified network request, in step 425, the cache manager sends back read results in step 429.

On the right side of FIG. 4B, in step 426, network interrupt identifies and receives a remote read request. In step 427, the cache manager calls a configuration manager routine that checks the configuration file and ignores bad requests in step 428. Correct requests proceed to step 420 for read exclusive processing. Step 425 returns the flow to step 429 that sends read results.

Figure 4C:
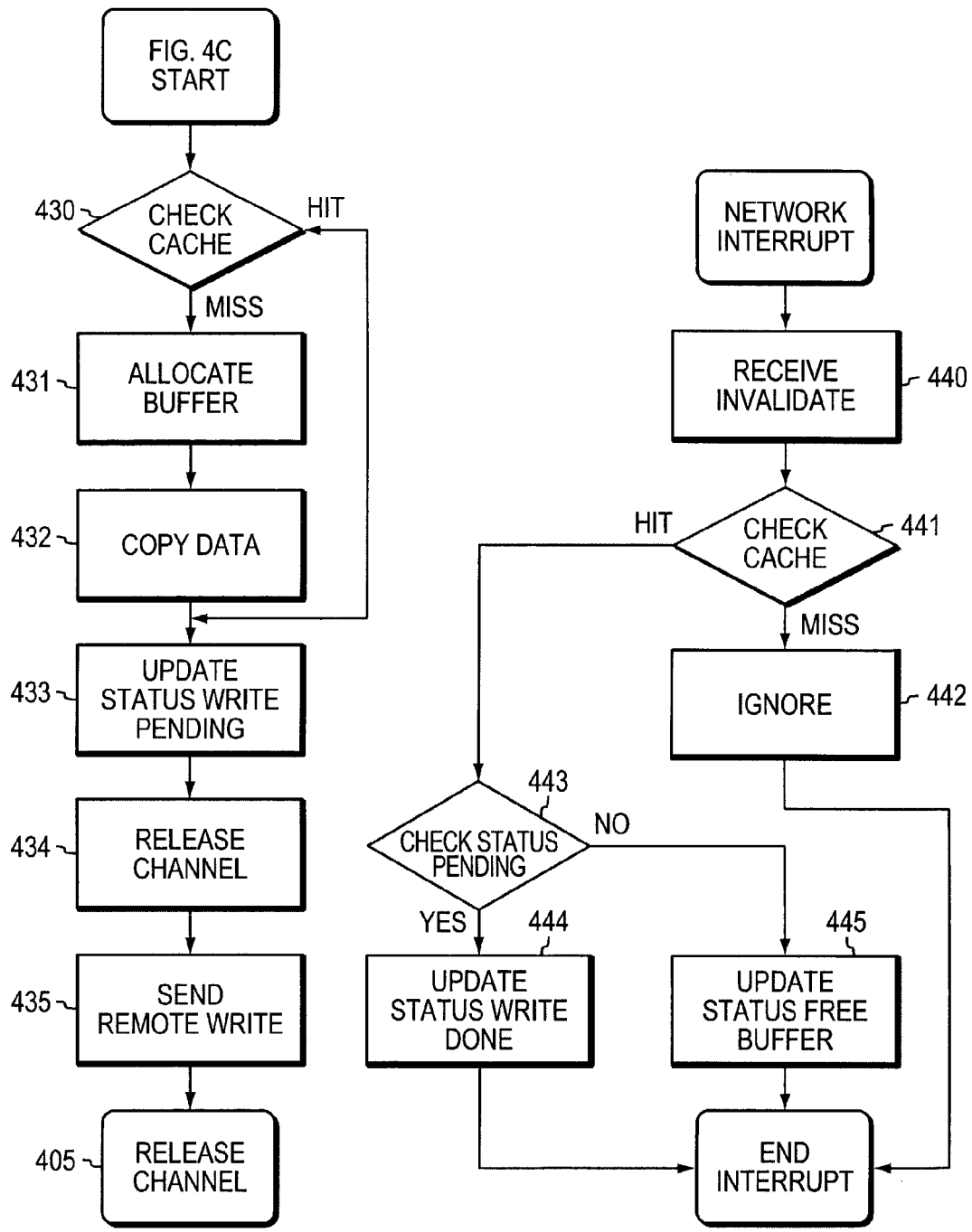

FIG. 4C shows a flowchart of the cache manager as it processes a write request in a shared mode. In step 430, the cache manager checks whether the requested buffer is in cache or not. For a cache miss, in step 431, the cache manager allocates a new buffer for storing data that will be written. For a cache hit, the cache manager branches directly to step 432 where data is copied into the newly allocated buffer. In step 433, the cache manager updates the buffer status with write pending and proceeds to step 434 to release the channel. In step 435, the cache manager calls a configuration manager routine that sends a remote write request to the host that holds this particular volume in an exclusive mode. In follow up to step 435, the cache manager returns to the beginning of FIG. 4.

On the right side of FIG. 4C, the cache manager updates the buffer status with write done in step 444. The flow begins with the network interrupt that calls configuration manager to validate the request in step 441. Bad requests are ignored in step 442. A correct request proceeds to step 443 that checks whether the status of this particular buffer is write pending. If the status is pending, in step 444, the cache manager updates the buffer status to write done. For any other buffer status, in step 445, the cache manager updates the status to free. This buffer is released in accordance with the invalidate request that has come from a remote host that holds this volume in an exclusive mode as has been described in FIG. 4A.

Figure 4D:
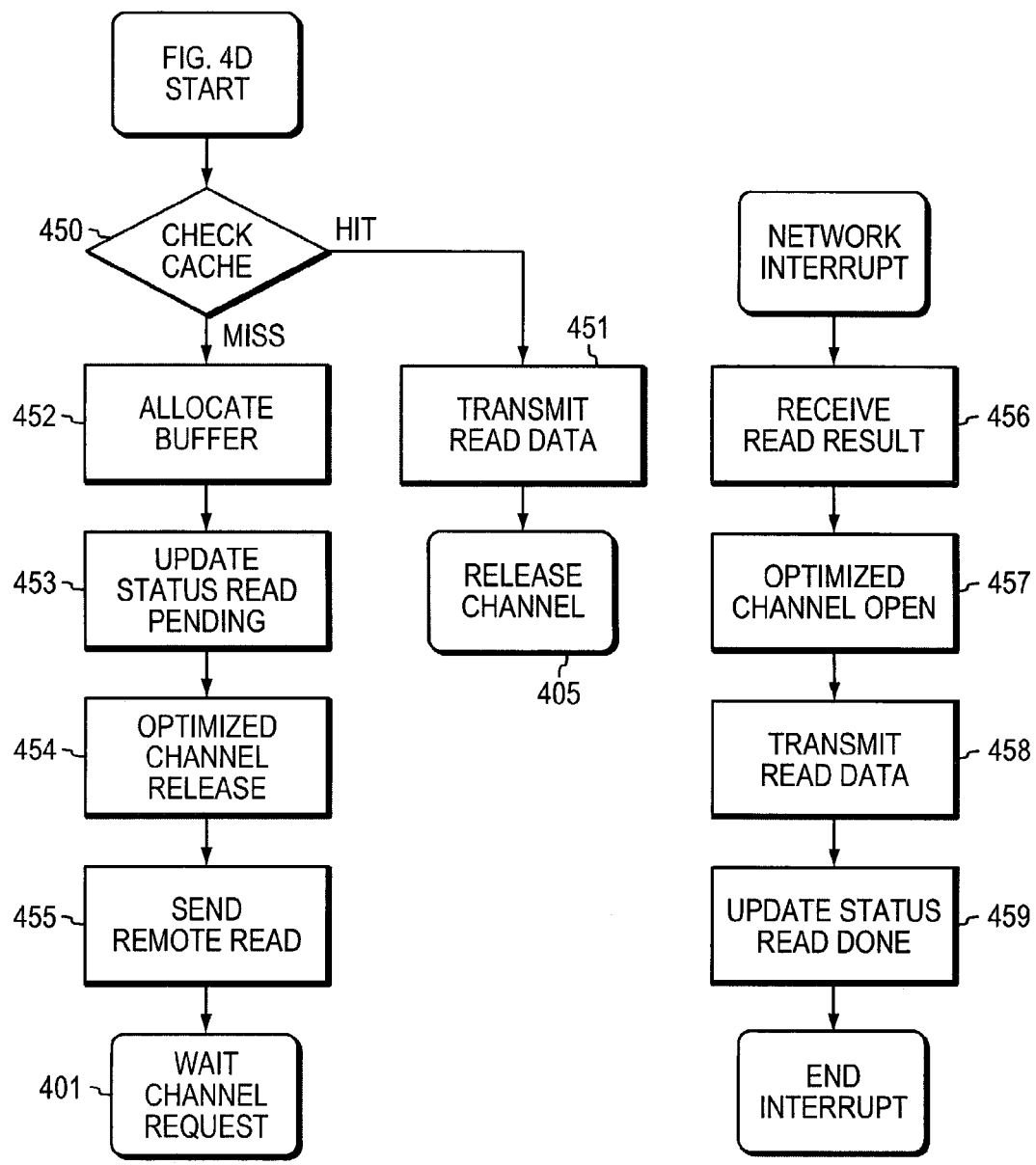
Figure 4E:
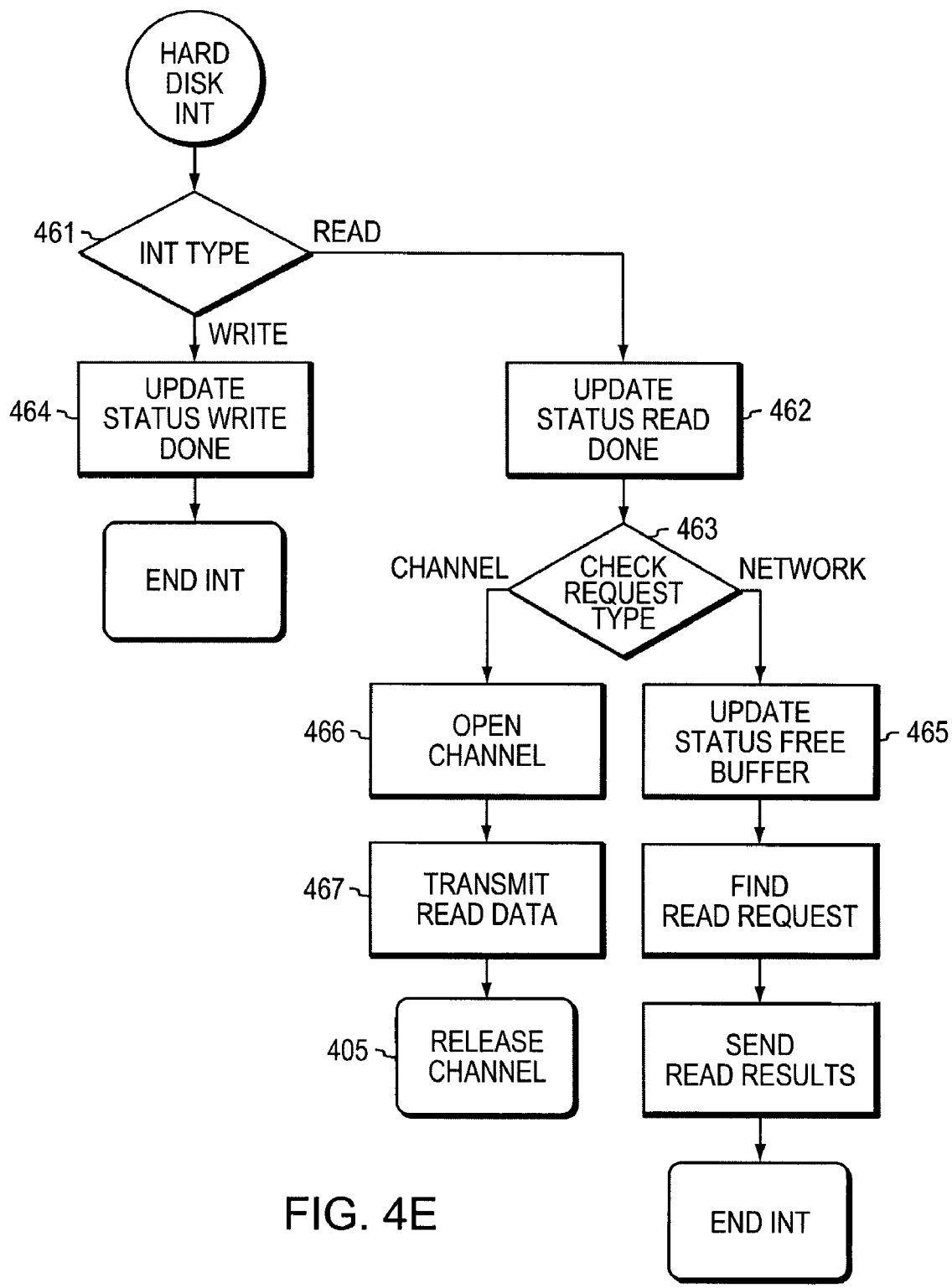

FIG. 4D shows a flowchart of the cache manager as it processes a read request in a shared mode. In step 450, the cache manager checks whether the requested buffer is in cache or not. For a cache miss, in step 452, the cache manager allocates a buffer for storing data that will be read into. For a cache hit, in step 451, the cache manager transmits read data and proceeds to step 405 to release the channel. In the case of the cache miss, the cache manager allocates a new buffer in step 452 and updates its status to read pending in step 453. In step 454, the cache manager closes the channel with an optimizer that maintains a pool of open channels which are kept open only for the specified amount of time. In step 455, the cache manager calls configuration manager routine that sends a remote read request to the host that holds this particular volume in an exclusive mode. The operations of the host holding volume in read exclusive mode have been shown in FIG. 4B.

On the right side of FIG. 4D, in step 456, a network interrupt identifies a remote read result. In step 457, the cache manager performs an optimized channel open. Depending upon the status of the optimizer that has been initiated in step 454, the cache manager may immediately get access to the still open channel or, if the optimizer fails, the cache manager may need to reopen the channel. In step 458, the cache manager transmits read data. In step 459, the cache manager updates the buffer status to read done and proceeds to step 459 where it releases the channel.

FIG. 4E shows a flowchart of the cache manager as it processes a hard disk interrupt request marking the completion of a read or write request. The read request has been started in step 423 in FIG. 4B. The write request has been started in step 475 in FIG. 4F. In step 460, the cache manager checks the type of the hardware interrupt. For a write interrupt in step 461, the cache manager updates the buffer status to write done and releases resources associated with the interrupt. For a read interrupt in step 462, the cache manager updates the buffer status to read done. In step 463, the cache manager checks request type of the read operation that has been started in FIG. 4B. For a channel request, the cache manager proceeds to open a channel in step 466. In step 467, the cache manager transmits read data and proceeds to release the channel in step 405. For a network request in step 464, the cache manager finds the remote read requests that initiated the request. In step 466, the cache manager sends read results and ends interrupt processing.

Figure 4F:
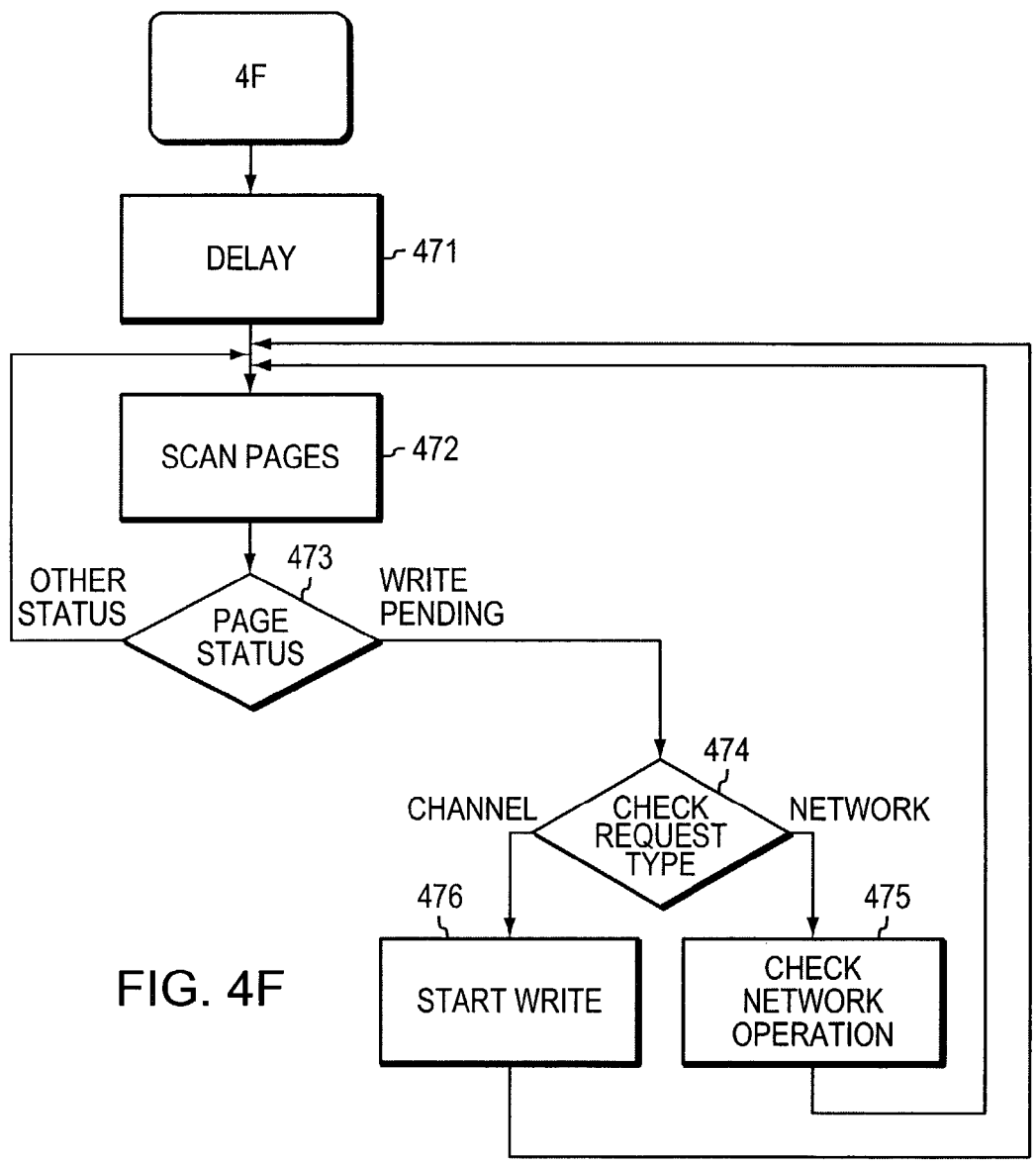

FIG. 4F shows a flowchart of a cache memory page flusher. The flusher is a separate daemon running as part of the cache manager. In step 471, the flusher waits for the specified amount of time. After the delay in step 472, the flusher begins to scan pages in cached memory. In step 473, the flusher checks the page status. If the page list has been exhausted in branch no more pages, the flusher returns to step 471 where it waits. If the page status is other than the write pending, the flusher returns to step 472 to continue scanning for more pages. If the page status is write pending, the flusher proceeds to step 474. In step 474, the flusher checks the request type. For a channel type, the flusher starts a read operation in step 475 and returns to scan pages in step 472. For a network type, the flusher checks for the network operations in progress and returns to step 472 for more pages.

FIG. 5 shows a data sharing operation between a plurality of heterogeneous host computers. In one embodiment the plurality of hosts includes but is not limited to a Sun Solaris workstation 111, Windows NT server 112, HP UNIX 106, and Digital UNIX 107 each accessing a distinct virtual device respectively 510, 520, 530 and 540. Configuration manager 560 provides concurrency control for accessing virtual devices that are mapped to the same physical device 161. The configuration manager uses a volume access table 450 that has been shown in FIG. 4.

A virtual device is a method that comprises three operations: initialization, read and write. The initialization operation registers a virtual device in an operating system on a heterogeneous host. Following the registration, the virtual device appears as if it is another physical device that can be brought on-line, offline or mounted on a file system. An application program running on the host cannot distinguish between a virtual device and a physical device.

For a virtual device, the read operation begins with a read from a physical device followed by a call to a translation module. The translation module inputs a shared record in a original format used on a physical disk and outputs the record in a new format that is specified for and is compatible with a host computer. The write operation begins with a call to a translation module that inputs a record in a new format and outputs a record in a shared format. The translation module is a dynamically loadable library that can be changed, compiled and linked at run-time.

The virtual device method described above allows a plurality of heterogeneous host computers to share one copy of data stored on a physical disk. In a data storage system using said virtual device method, a plurality of virtual devices is maintained in cache without requiring a copy of data on a physical disk.

While the invention has been described in connection with a preferred embodiment, it is not intended to limit the scope of the invention to the particular form set forth.

What is claimed is:

1. A data storage system for use in a first computer connected to a packet-switched network comprising a plurality of remotely located other computers, wherein each computer connected to the packet-switched network has an operating system, the data storage system comprising:
   a plurality of storage devices attached to the first computer;
   a network adapter for transmitting data and control signals over the packet-switched network;
   a front-end software component located at the first computer in communication with the network adapter and configured to handle at least direct access I/O requests arriving at the network adapter and I/O channel commands, wherein the direct access I/O requests are made by the remotely located other computers, at least two of the remotely located other computers having a different operating system, and each computer connected to the packet-switched network is configured to handle data in a data format corresponding to its respective operating system;
   an I/O channel adapter configured to provide via an I/O protocol layer, free of network delay, access to data stored on the storage devices;
   a management software component located at the first computer configured to enable at least one of the remotely located other computers connected to the packet-switched network to access the I/O channel adapter, said management software component including a volume access table containing access mode parameters and data mapping portions of said storage devices to at least one of the remotely located other computers with corresponding operating system, wherein the access mode parameters include a shared access parameter or an exclusive access parameter;
   a translation software component configured to translate the accessed data into a format accessible by one of the remotely located other computer;
   a cache memory and a cache manager software component located at the first computer, responsive to said front-end software component, configured to handle data stored in said cache; and
   a back-end software component located at the first computer, responsive to said management software component, configured to handle direct access read and write operations to said storage devices corresponding to the direct access I/O requests exclusive of the front-end software, thereby separating the read and write operations from network traffic;
   wherein the data on the first computer is stored in the cache memory, wherein the cache memory comprises a portion of a distributed cache memory stored in the first computer and the remotely located other computers on the network;
   wherein the computers comprise an off-the shelf hardware and an off-the shelf operating systems;
   wherein at least some of the remotely located other computers comprise at least one storage device;
   wherein the management software component employs a file system from the off-the-shelf operating system; and
   wherein the management software component manages at least some of the storage devices on remotely located other computers as virtual storage devices.

2. The system of claim 1 wherein:
   the management software further enables any remotely located other computer to store data on the first computer; and
   the translation software facilitates translating data from the remotely located other computer into a format compatible with the first computer.

3. A data sharing system for use in a packet-switched network comprising a plurality of remotely located heterogeneous computers, with each remotely located computer on the packet-switched network having an operating system, the data sharing system comprising:
   a storage device attached to a first computer;
   an I/O channel adapter interfacing the first computer to the packet-switched network, wherein the I/O channel adapter is configured to provide via an I/O protocol layer, free of network delay, access to data stored on the storage device;
   a plurality of virtual devices mapped to the storage device, said storage device storing at least one data record that is shared between remotely located heterogeneous computers having different operating systems, wherein each virtual device provides access to said data record in accordance with a data format consistent with the respective operating system of a remotely located heterogeneous computer requesting access to said data record over the packet-switched network, and each remotely located heterogeneous computer on the packet-switched network is configured to handle data in a data format corresponding to its respective operating system;
   a cache memory and a cache manager software component located at the first computer and configured to handle data stored in the cache memory, wherein the data on the first computer is stored in the cache memory, wherein the cache memory comprises a portion of a distributed cache memory stored in the first computer and the remotely located heterogeneous computers on the network; and
   said virtual device including a translation module configured to translate between a first data format and a data format of the respective operating system of the remotely located heterogeneous computer requesting said data record;
   wherein the first computer comprises:
      a configuration manager program for providing concurrency control for accessing the virtual device; and
      an off-the shelf hardware and an off-the shelf operating systems;
   wherein said configuration manager employs a volume access table having access mode parameters and mapping portions of said storage device to corresponding remotely located heterogeneous computers; wherein the access mode parameters include a shared access parameter or an exclusive access parameter; and
   wherein each virtual device further comprises:
      an initialization means for registering the virtual device in at least one remotely located heterogeneous computer connected to the network;
      a read means for allowing at least one remotely located heterogeneous computer to access data stored on the storage device using the translation module as an intermediary; and a write means for allowing at least one remotely located heterogeneous computer to store data on the storage device in a shared data format using the translation module as an intermediary.

4. A data storage system for use in a packet-switched network comprising a plurality of remotely located computers with each of the plurality of remotely located other computers having an operating system, the storage system comprising:
a plurality of storage devices attached to the first computer;
a network adapter for transmitting data and control signals over the network;
an I/O channel adapter interfacing the first computer to the packet-switched network, wherein the I/O channel adapter is configured to provide via an I/O protocol layer, free of network delay, access to data stored on the plurality of storage devices;
a front-end software component located at the first computer for handling direct access I/O requests arriving through the network at the network adapter and handling I/O channel commands, wherein the direct access I/O requests are made by the remotely located other computers, at least two of the remotely located other computers having a different operating system, and each remotely located computer on the network is configured to handle data in a data format corresponding to its respective operating system;
a management software component located at the first computer enabling at least one of the remotely located other computers connected to the network to access data stored on the storage devices, said management software having a volume access table containing access mode parameters and data mapping portions of said storage devices to at least one of the remotely located other computers with corresponding operating system;
a cache memory, wherein the data on the first computer is stored in a cache memory, wherein the cache memory comprises a portion of a distributed cache memory stored in the first computer and the remotely located other computers on the network; and
a plurality of virtual devices mapped to the same physical device accessible through the first computer, said physical device storing a data record shared between remotely located computers with different operating systems, each virtual device configured to provide access to said data record for a computer with a corresponding operating system; and
a back-end software located at the first computer, responsive to said management software, for handling reads and writes to said storage devices corresponding to the direct access I/O requests exclusive of communication over the front-end software, thereby separating storing operations from network traffic;
wherein said virtual device comprises a translation software component for translating said data record into a format compatible with the corresponding operating system, and
wherein the remotely located computers and the first computer comprise off-the shelf hardware and off-the shelf operating systems.

5. The system of claim 4, wherein said physical device is a cache memory of the first computer.

6. The system of claim 4, wherein said physical device is a storage disk attached to the first computer.

7. The system of claim 4, further comprising a cache memory and a cache manager software component, responsive to said front-end software component, for handling data stored in said cache.

8. The system of claim 4, wherein said I/O channel adapter accepts SCSI I/O commands.

9. The system of claim 8, wherein said I/O channel adapter is further enabled to open and close SCSI channels.

10. A data sharing system for use in a computer with an attached storage device, said data sharing system comprising:
a data record stored on said storage device;
an I/O channel adapter interfacing the computer to a network, wherein the I/O channel adapter is configured to provide to a plurality of remotely located other computers via an I/O protocol layer, free of network delay, access to data records stored on the storage device;
a plurality of virtual devices mapped into said storage device storing the data record, the data record shared between applications running under different operating systems; and
a cache memory and a cache manager software component responsive to said front-end software component, for handling data stored in the cache memory; wherein the cache memory comprises a portion of a distributed cache memory stored in the computer and the remotely located other computers on the network;
wherein each virtual device provides access to said data record for all applications running under the corresponding operating system; and
each virtual device including an initialization module for initializing said virtual device and a translation module for translating the data record from its original format into a format consistent with the operating system of the application requesting the data record;
a network adapter for transmitting data and control signals over the network;
a front-end software component located at the computer for handling direct access I/O requests arriving at the network adapter and handling I/O channel commands;
a management software component located at the computer enabling one of the remotely located other computers connected to the network to access data stored on the storage devices attached to the computer, said management software component having a volume access table, containing access mode parameters and mapping portions of said storage devices to corresponding computers, wherein the access mode parameters include a shared access parameter or an exclusive access parameter; and
a back-end software component located at the computer, responsive to said management software, for handling reads and writes to said storage devices corresponding to the I/O requests exclusive of communication over the front-end software, thereby separating storing operations from network traffic,
wherein the remotely located other computers comprise off-the shelf hardware and off-the shelf operating systems.

11. The system of claim 10, wherein said I/O channel adapter accepts target SCSI 1/0 commands.

12. The system of claim 11, wherein said I/O channel adapter is further enabled to open and close SCSI channels.

13. The system of claim 1, wherein said I/O channel adapter accepts target SCSI 1/0 commands.

14. The system of claim 13, wherein said I/0 channel adapter is further enabled to open and close SCSI channels.

* * * * *

UNITED STATES PATENT AND TRADEMARK OFFICE
CERTIFICATE OF CORRECTION

PATENT NO.         : 8,225,002 B2                                       Page 1 of 1
APPLICATION NO.    : 10/382016
DATED              : July 17, 2012
INVENTOR(S)        : Ilya Gertner It is certified that error appears in the above-identified patent and that said Letters Patent is hereby corrected as shown below:

At column 12, line 56, in Claim 11 of the Patent: Please delete "1/0" and replace with -- I/O --

At column 12, line 60, in Claim 13 of the Patent: Please delete "1/0" and replace with -- I/O --

At column 12, line 61, in Claim 14 of the Patent: Please delete "1/0" and replace with -- I/O --

Signed and Sealed this
Twenty-fifth Day of September, 2012

David J. Kappos
*Director of the United States Patent and Trademark Office*